Patented July 27, 1954

2,684,914

UNITED STATES PATENT OFFICE 2,684,914

METHOD OF INCREASING THE VISCOSITY OF SODIUM CARBOXYMETHYLCELLULOSE SOLUTIONS AND COMPOSITIONS SO FORMED

Herbert L. Heiss, Anniston, Ala., assignor to S. C. Johnson & Son, Inc., Racine, Wis.

No Drawing. Application June 2, 1951, Serial No. 229,653

6 Claims. (Cl. 106—197)

The invention relates to a method of increasing the viscosity of such solutions and the composition produced thereby.

The stabilizing effect of sodium carboxymethylcellulose has been appreciated and used commercially for several years. This material acts as a protective colloid; i. e., it forms a covering envelope for dispersed particles and stabilizes them from the coagulating effects of electrolytes. Although through the inclusion of sodium carboxymethylcellulose, the viscosity and thixotropic qualities of the solution are definitely increased for a period of time, nevertheless, after an extended period, especially with aqueous solutions, the solutions drop substantially in viscosity and the dispersed particles, formerly stabilized by the carboxymethylcellulose, pack or "layer out" in the container.

In an effort to augment or retain for an extended period of time the viscosity and thixotropy-promoting powers of sodium carboxymethylcellulose, I have discovered a process, the practice of which eliminates this inaptitude. Furthermore, the practice of the invention permits exacting control over the viscosity of such solutions for extended periods of time, and provides for the production of compositions having prolonged "shelf life."

Now, in accordance with my invention, I have developed a method of increasing the viscosity of solutions containing sodium carboxymethylcellulose and retaining such increased viscosity, which includes admixing in a sodium carboxymethylcellulose-containing solution a small amount of formaldehyde and a material selected from the group consisting of sodium hydroxide and sodium salt of ortho phenyl phenol.

Also in accordance with my invention, I have developed a composition which comprises a solution containing dispersed particles and sodium carboxymethylcellulose as a protective colloid of said particles, less than one per cent by weight of formaldehyde and a material selected from the group consisting of sodium hydroxide and sodium salt of ortho phenyl phenol.

Now, having indicated in a general way, the nature and purpose of the invention, the following examples will illustrate the invention. It is to be understood, however, that such examples are presented merely as illustrations of the invention and are not to be construed as limiting the same. In the examples, the ingredients are given in parts by weight unless otherwise indicated.

EXAMPLE 1

A solution was produced containing 7.5 parts of sodium carboxymethylcellulose, 893.6 parts of water, 86.3 parts of glycerin and 12.6 parts of a 37 per cent solution of formaldehyde. For purposes of reading the table below, this solution shall be identified as Product No. 1.

Another solution was produced which was identical to that of Product No. 1, both in the ingredients incorporated and quantities thereof, with the exception that 2.6 parts of the sodium salt of ortho phenyl phenol was added. For purposes of reading the table below, this solution shall be identified as Product No. 2.

A solution was formulated identical to that of Product No. 1, both in ingredients and quantities thereof, with the exception that .3 part of sodium hydroxide was added. For purposes of calculating the table below, this solution will be identified as Product No. 3.

Each of the three products was viscolized and viscosity increase studies of each were made. The viscosity readings were made from a Brookfield Viscosimeter, each product receiving ten minutes agitation with a No. 3 spindle moving at 30 R. P. M. before viscosity readings were determined. The readings in centipoises were as follows:

Table No. I

|  | Product No. 1 | Product No. 2 | Product No. 3 |
|---|---|---|---|
|  | Cps. | Cps. | Cps. |
| Initial Viscosity | 408 | 364 | 330 |
| 4 hours | 580 | 520 | 440 |
| 8 hours | 760 | 700 | 680 |
| 20 hours | 1,016 | 1,000 | 980 |
| 48 hours | 1,025 | 1,081 | 1,093 |
| 72 hours | 1,220 | 1,230 | 1,240 |
| 96 hours | 1,440 | 1,400 | 1,240 |
| 7 days | 1,420 | 1,580 | 1,700 |
| 14 days | 1,380 | 1,760 | 1,780 |
| 30 days | 1,400 | 1,900 | 2,000 |
| 60 days | 1,250 | 2,400 | 2,440 |
| 5 months | 840 | 2,640 | 3,080 |

EXAMPLE 2

The products in Example 1 were used to produce an automobile cleaner and polish. To each was added 22.7 parts of molten paraffin wax, 100.3 parts of diatomaceous earth having a mesh size of 325, and 123.8 parts paraffin oil. The products were then tested at intervals for viscosity readings. At the end of five months, the products bore substantially the same viscosity relationship as the products of Example 1. It was noted that Product No. 1, that containing no sodium hydroxide or sodium salt of ortho phenyl phenol, indicated little stability, whereas Products No. 2 and 3 appeared homogeneous.

EXAMPLE 3

An aqueous solution was prepared with 992.5 parts of water and 7.5 parts of sodium carboxymethylcellulose. Sufficient sodium hydroxide was added to the solution to raise the pH to 9. Calculation of the amount of sodium hydroxide necessary was made by the Beckman pH Meter. The solution was then divided into four equal portion of 250 parts each and the following admixtures made. First portion, no additive; second portion, 2.5 parts of a 37 per cent solution of formaldehyde was added; third portion, 0.9 part of a 30 per cent solution of glyoxal was added; fourth portion, 1.8 parts of a 30 per cent solution of glyoxal was added. These portions, identified chronologically in the table below, were tested with a Brookfield Viscosimeter, employing a No. 3 spindle traveling at 30 R. P. M. with readings being taken after a lapse of two minutes from the time the spindle was activated.

*Table No. II*

|  | I | II | III | IV |
| --- | --- | --- | --- | --- |
|  | Cps. | Cps. | Cps. | Cps. |
| 24 hours | 1,140 | 1,060 | 332 | 196 |
| 7 days | 1,380 | 1,375 | 100 | 60 |
| 14 days | 1,575 | 1,540 | 72 | 40 |
| 21 days | 1,900 | 1,800 | 60 | 32 |
| 28 days | 1,560 | 1,704 | 80 | 40 |
| 5 months | 1,240 | 2,240 | 20 | 20 |

EXAMPLE 4

A solution was prepared from fifteen parts sodium carboxymethylcellulose and 2,985 parts of water. This solution was divided equally into 3 parts of 1000 parts of each and to the first portion was added 30 parts of a 37 per cent solution of formaldehyde; to the second portion, 30 parts of a 37 per cent solution of formaldehyde and 3 parts of sodium hydroxide; to the third portion, 3 parts of sodium hydroxide. The viscosity readings were calculated on the three portions and determined in centipoises by means of a Brookfield Viscosimeter. A No. 2 spindle traveling at 30 R. P. M. was employed and readings taken after a two minute interval from the time of activation. The readings were as follows:

*Table No. III*

|  | I | II | III |
| --- | --- | --- | --- |
|  | Cps. | Cps. | Cps. |
| Initial Viscosity | 96 | 52 | 51 |
| 3 days | 125 | 84 | 62 |
| 7 days | 134 | 146 | 52 |
| 14 days | 115 | 204 | 36 |
| 21 days | 132 | 333 | 38 |
| 28 days | 144 | 440 | 36 |
| 60 days | 207 | 560 | 40 |
| 5 months | 268 | 845 | 45 |

The viscosity-increasing power of sodium hydroxide or the sodium salt of ortho phenyl phenol, when combined in a solution containing carboxymethylcellulose and formaldehyde, is emphatically illustrated in Examples 1 and 2. Therein it will be seen that Product No. 1, a carboxymethylcellulose solution containing formaldehyde, had a viscosity of 840 centipoises after five months. Product No. 2, after five months, showed an increase of approximately 2300 centipoises over its initial viscosity. Yet the only distinguishing feature between Products 1 and 2 was the inclusion of the sodium salt of ortho phenyl phenol in Product No. 2. Product No. 3 likewise demonstrated a continual growth in thixotropy and its viscosity at the end of five months was approximately 2700 centipoises greater than the initial viscosity. The only additive in Product No. 3 not present in Product No. 1 was sodium hydroxide. Therefore, Example 1 conclusively illustrates that either sodium hydroxide or the sodium salt of ortho phenyl phenol must be present with the formaldehyde.

The centipoise readings were determined by a Brookfield Synchro-Lectric Viscosimeter. A spindle extends downwardly from the meter and it is immersed in the sample to be tested. Viscosity is calculated from the measurement of the drag produced upon the spindle rotating at a definite constant speed while immersed.

In Example 3 where four samples were prepared, all of which had a pH of 9 and all of which contained sodium carboxymethylcellulose and sodium hydroxide, only sample No. 2 did not weaken in viscosity and, in fact, increased. This sample was the only one to which formaldehyde was added. In samples 3 and 4, proportions of glyoxal, an aldehyde related to formaldehyde, was introduced. Yet the results, as illustrated by Table No. II, were far inferior to that demonstrated by the sample containing formaldehyde in conjunction with sodium hydroxide. Remarkably, substantially more viscosity was possessed by the sample (1) containing only sodium hydroxide than those to which this aldehyde, glyoxal, was combined (3 and 4).

In Example 3, a study is made of the highly contrasting effects in viscosity between sodium carboxymethylcellulose solutions containing formaldehyde, sodium hydroxide and formaldehyde, and sodium hydroxide alone. The expedient dependency of the two materials for each other is disclosed in Table No. III in the calculations set forth for Product No. 2. Therein, it will again be noted that results rendered by this combination are far superior to the effects of the ingredients used individually.

Whether this increase in viscosity and thixotropic properties demonstrated in the foregoing is the result of a phenomenon due to a chemical reaction such as a cross linking between the sodium carboxymethylcellulose and formaldehyde molecules or some other factor, such as the promotion by the additives of the gelling tendencies of the sodium carboxymethylcellulose molecules, is not known.

The exact percentages of the selective combination of additives is not critical. However, a very small proportion of formaldehyde is capable of augmenting the reaction, not more than 1 per cent ever being required.

Likewise, it will be noted from the examples that a very small amount of either sodium hydroxide or sodium salt of ortho phenyl phenol is capable, when combined with the formaldehyde, of rendering the phenomenal viscosity change. Under practically all conditions and in all desired applications, less than one per cent should be highly adequate to promote this character.

Other methods of applying the principles of the invention may be employed instead of those explained, changes being made as regards the method or apparatus herein disclosed, provided the steps or elements stated by any of the following of such stated steps or elements may be employed.

I claim:

1. A method of increasing the viscosity of solutions containing sodium carboxymethylcellulose, comprising admixing in a sodium carboxymethylcellulose-containing solution a small amount of but not more than one per cent by weight of formaldehyde and a small amount of but not more than one percent of sodium hydroxide.

2. A method of increasing the viscosity of solutions containing sodium carboxymethylcellulose, comprising admixing in an aqueous solution containing sodium carboxymethylcellulose a small amount of but not more than one per cent by weight of formaldehyde and sodium hydroxide.

3. A method of increasing the viscosity of solutions containing sodium carboxymethylcellulose, comprising admixing in an aqueous solution containing sodium carboxymethylcellulose a small amount of but not more than one per cent by weight of formaldehyde and a small amount but not more than one per cent by weight of sodium hydroxide.

4. A composition comprising a solution having colloidal particles suspended therein, sodium carboxymethylcellulose as a protective colloid for said particles, a small amount of but not more than one per cent by weight of formaldehyde and a small amount of but not more than one percent of sodium hydroxide.

5. A composition comprising an aqueous solution having colloidal particles suspended therein, sodium carboxymethylcellulose as a protective colloid for said particles, a small amount of but not more than one per cent by weight of formaldehyde and sodium hydroxide.

6. A composition comprising an aqueous solution having colloidal particles suspended therein, sodium carboxymethylcellulose as a protective colloid for said particles, a small amount of but not more than one per cent by weight of formaldehyde and not more than one per cent by weight of sodium hydroxide.

References Cited in the file of this patent

UNITED STATES PATENTS

| Number | Name | Date |
|---|---|---|
| 2,210,146 | Eggert | Aug. 6, 1940 |
| 2,510,355 | Waldeck | June 6, 1950 |

OTHER REFERENCES

Hercules "Sodium Carboxymethylcellulose"—1944—page 4, Hercules Powder Company, Cellulose Products Dept., Wilmington, Delaware.